G. B. ST. JOHN.
Seed Dropper.
No. 101,537. Patented April 5, 1870.
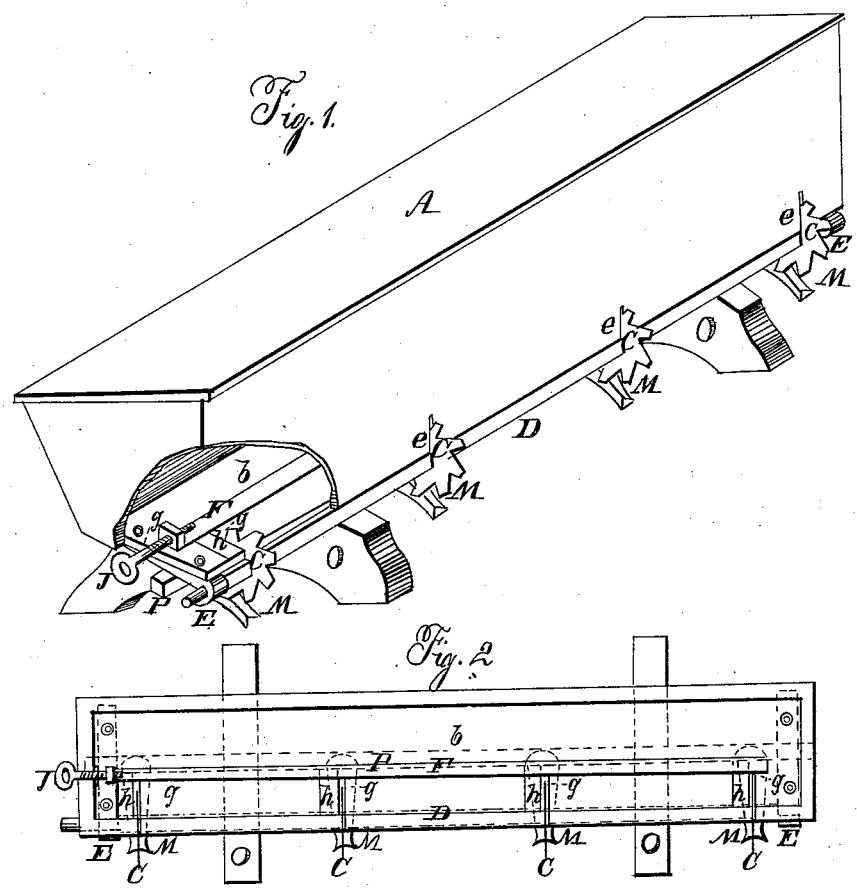
Witnesses
Inventor
Garland B St John

United States Patent Office.

GARLAND B. ST. JOHN, OF KALAMAZOO, MICHIGAN.

Letters Patent No. 101,537, dated April 5, 1870.

IMPROVEMENT IN ATTACHMENT TO SEEDING-MACHINES.

The Schedule referred to in these Letters Patent and making part of the same.

*To all whom it may concern:*

Be it known that I, GARLAND B. ST. JOHN, of the village of Kalamazoo, in the county of Kalamazoo and State of Michigan, have invented a new and improved Attachment to Seeding-Machines; and I do hereby declare that the following is a full, clear, and exact description thereof, which will enable those skilled in the art to make and use the same, reference being had to the accompanying sheet of drawings forming a part of these specifications.

This invention relates to a new and improved device for feeding the grain from the hopper, and also an improved manner of constructing the scattering-spouts for spreading the grain over the ground.

The object of this invention is to obtain a simple and efficient feeding apparatus, that will sow all kinds of grain and grass-seed perfectly; that will not cut grain; that is free from clogging; that is simple in construction, and not liable to get out of order; also, a cheaply-constructed scattering-spout.

In the accompanying sheet of drawings—

Figure 1 is a perspective drawing of my invention, with the corner of the hopper cut away to show the construction of the feeding-device.

Figure 2 is a plan or top view of the bottom, showing the arrangement of the parts of the machine.

Similar letters of reference indicate corresponding parts.

The hopper A, fig. 1, is so constructed that the bottom board $b$ inclines to the front, for the purpose of throwing the grain onto the feeding-saws $C'$ $C'$, which are mounted on a shaft, D, that runs in boxes E E. Said feeding-saws are made of sheet-iron, or other sheet metal sufficiently strong.

A hole is punched in the center for the shaft, and the teeth are cut with their front face inclined, so that, when in motion, they work smoothly in the slots $e'$ $e'$, made in the front board of the hopper, just wide enough for them to pass, and which serve the purpose of holding them in place.

The incline of the tooth serves, also, the purpose of pushing back all straws or sticks from the openings $g'$ $g'$ in the bottom board $b$, allowing the heavier grain to sow through easily, obviating the possibility of clogging, and at the same time doing away with the objection of cutting the grain, as their inclined faces come in contact with the grain at an angle that does not force it through the openings, but clears them from obstructions, and keeps the grain in constant agitation, thereby allowing it to pass out freely, without being compressed and cut, as (it is urged) is the case with a force-feed.

In fig. 2, the openings $g'$ $g'$ in the bottom board $b$, through which the grain passes, are regulated, as to size, by means of slide F, which passes longitudinally through the hopper and over transverse openings $g'$ $g'$, by means of transverse sections $h'$ $h'$, which are opened and closed by means of set-screw J, which is held to its place in the end board of the hopper by means of pin $n$.

Under the feeding-saws, and running lengthwise of the hopper, is rod P, to which the scattering-spouts M' M' are attached, which spouts are made of light sheet metal, with semiconical-shaped elevations on their ends, that spread the grain as it strikes upon, and rebounds from them.

The whole rests on blocks O O, which may be secured, by means of bolts, to any machine for the grain, and the machine set in motion by applying belt or gear to the shaft D.

That which is new, and which I claim as my invention and wish to secure by Letters Patent, is—

1. The feeding-saws C' C', held to place in slots $e'$ $e'$, and running with their inclined faces toward the grain, in the manner and for the purposes hereinbefore specified.

2. The spouts M' M', constructed and arranged in the manner and for the purpose specified.

GARLAND B. ST. JOHN.

Witnesses:
THERON F. GIDDINGS,
ARTHUR BROWN.